US012442507B2

(12) United States Patent
Ait-Hammou-Hassi et al.

(10) Patent No.: US 12,442,507 B2
(45) Date of Patent: Oct. 14, 2025

(54) LIGHT-EMITTING MODULE COMPRISING A MOUNT INTENDED TO DISSIPATE HEAT

(71) Applicant: VALEO VISION, Bobigny (FR)

(72) Inventors: Omar Ait-Hammou-Hassi, Bobigny (FR); Theo Artus, Bobigny (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 18/684,091

(22) PCT Filed: Aug. 29, 2022

(86) PCT No.: PCT/EP2022/073870
§ 371 (c)(1),
(2) Date: Feb. 15, 2024

(87) PCT Pub. No.: WO2023/031072
PCT Pub. Date: Mar. 9, 2023

(65) Prior Publication Data

US 2024/0426457 A1 Dec. 26, 2024

(30) Foreign Application Priority Data

Aug. 31, 2021 (FR) ..................................... 21 09080

(51) Int. Cl.
*F21S 45/47* (2018.01)
*F21S 41/141* (2018.01)
(Continued)

(52) U.S. Cl.
CPC ............. *F21S 45/47* (2018.01); *F21S 41/141* (2018.01); *F21S 41/192* (2018.01); *F21S 43/14* (2018.01);
(Continued)

(58) Field of Classification Search
CPC .......... F21S 41/19; F21S 41/198; F21S 45/00; F21S 45/47; F21S 41/192; F21S 45/49;
(Continued)

(56) References Cited

U.S. PATENT DOCUMENTS 10,330,285 B2 6/2019 Son et al.
2015/0308652 A1* 10/2015 Cabanne ................ F21S 41/39 362/547

(Continued)

FOREIGN PATENT DOCUMENTS

CN 105020652 B 9/2017
EP 3 396 239 A1 10/2018

(Continued)

OTHER PUBLICATIONS

International Search Report & Written Opinion Issued Nov. 21, 2022, in PCT/EP2022/073870, filed on Aug. 29, 2022, 14 pages (with English Translation).

(Continued)

*Primary Examiner* — Omar Rojas Cadima
(74) *Attorney, Agent, or Firm* — Oblon, McClelland, Maier &Neustadt, L.L.P.

(57) ABSTRACT

A light-emitting module includes a light source, a support intended to dissipate heat, and an electrical connector connected to the light source. The support includes a base extending substantially in a first plane, the base being provided with a first face to which the light source and the electrical connector are fastened. The electrical connector includes an input arranged along a first edge of the base, and the support includes a first fin protruding with respect to the first plane on the side of the first face, the first fin being connected to the base by a single connecting segment.

20 Claims, 4 Drawing Sheets

(51) Int. Cl.

| | |
|---|---|
| ***F21S 41/19*** | (2018.01) |
| ***F21S 43/14*** | (2018.01) |
| ***F21S 43/19*** | (2018.01) |
| ***F21S 45/49*** | (2018.01) |
| *F21Y 115/10* | (2016.01) |

(52) U.S. Cl.

CPC ............. *F21S 43/195* (2018.01); *F21S 45/49* (2018.01); *F21Y 2115/10* (2016.08)

(58) Field of Classification Search

CPC ...... H01R 13/74; H01R 13/743; H01R 12/70; H01R 12/714; H01R 33/94; H01R 33/975; H01L 23/32; H01L 23/34; H05B 31/0042; H05B 31/18; H05B 31/24

USPC .......................... 362/546–549, 655, 373–374

See application file for complete search history.

(56) References Cited

U.S. PATENT DOCUMENTS

| | | | | |
|---|---|---|---|---|
| 2017/0299143 | A1 | 10/2017 | Mornet | |
| 2018/0112853 | A1 | 4/2018 | Son et al. | |
| 2018/0283646 | A1* | 10/2018 | Hunt | H01R 13/743 |
| 2021/0022244 | A1 | 1/2021 | Roldan et al. | |

FOREIGN PATENT DOCUMENTS

| | | | | |
|---|---|---|---|---|
| JP | 2010-17685 A | | 1/2010 | |
| JP | 2010-176859 A | | 8/2010 | |
| JP | 2013-127882 | | 6/2013 | |
| JP | 5712914 B2 | | 5/2015 | |
| WO | WO-2019185892 A1 | * | 10/2019 | F21S 41/141 |

OTHER PUBLICATIONS

French Search Report Issued Apr. 27, 2022, in FR 21 09080, filed on Aug. 31, 2021, 3 pages (with Translation of Category).

Japanese Office Action issued on Dec. 6, 2024 in Japanese Patent Application No. 2024-513508 (with English translation), 6 pages.

Office Action mailed Apr. 11, 2025, in Japanese Application No. 2024-513508 filed Aug. 29, 2022 (w/English translation).

* cited by examiner

LIGHT-EMITTING MODULE COMPRISING A MOUNT INTENDED TO DISSIPATE HEAT

TECHNICAL FIELD OF THE INVENTION

The invention relates to the field of lighting devices for automotive vehicles. More precisely, the invention relates to a light-emitting module comprising a light source and a support intended to dissipate heat. The invention also relates to an optical module and a luminous device for an automotive vehicle comprising such a light-emitting module.

PRIOR ART

Luminous devices for automotive vehicles, such as headlamps, signaling lights or interior lighting devices for the passenger compartment, are designed according to numerous dimensional requirements imposed both by the esthetic appearance of the vehicle, by the space available for their incorporation, and by the different light functions that the luminous device must perform. Moreover, luminous devices comprise at least one light source which must be electrically powered. A wiring harness therefore connects the light source to an electrical energy source of the vehicle. For assembly and simple maintenance of the vehicle, the wiring harness has to be able to be easily connected to and disconnected from the light source.

When the light source incorporated into the luminous device operates, it also produces heat. This heat has to be dissipated in order to allow correct operation. To this end, the use of a heat exchanger in contact with the light source is known. To improve the effectiveness of the heat exchanger, it is known to increase its surface area. This increase in surface area is reflected in an increase in the footprint of the heat exchanger within the luminous device. The heat exchanger may then hinder the operation for connecting or disconnecting the wiring harness to or from the light source. Such a luminous device is then more complex to assemble or maintain.

PRESENTATION OF THE INVENTION

The aim of the invention is to provide a light-emitting module that remedies the drawbacks above and improves the light-emitting modules known from the prior art.

More precisely, a first subject of the invention is a light-emitting module that is both simple to manufacture and simple to electrically connect.

A second subject of the invention is a light-emitting module that is both compact and able to effectively dissipate the heat produced by a light source.

SUMMARY OF THE INVENTION

The invention relates to a light-emitting module comprising a light source, notably a light-emitting diode, a support intended to dissipate heat, and an electrical connector connected to the light source, the support comprising a base extending substantially in a first plane, the base being provided with a first face to which the light source and the electrical connector are fastened, the electrical connector comprising an input arranged along a first portion of a first edge of said base, the support comprising a first fin protruding with respect to said first plane on the side of said first face, the first fin being connected to the base by a single connecting segment, the connecting segment being arranged along a second portion of said first edge, the second portion being separate from the first portion. The term "separate" is understood to mean that the two portions do not overlap, either partially or completely. The single element that may potentially be common is a point that simultaneously constitutes an end of each of the two portions. However, this common point does not generate an overlap, the two portions then touching one another only by their common end, and being situated in the extension of one another.

The invention may comprise one or more of the following features, taken alone or in combination.

The light-emitting module may comprise a free volume extending at least facing the input of the electrical connector.

The first fin may comprise a primary part extending substantially in a second plane perpendicular to said first plane.

The fin may comprise at least one secondary part extending substantially in a third plane perpendicular to said first plane and to said second plane.

The at least one secondary part may extend in a volume defined by an orthogonal projection of the base.

The support may comprise a second fin protruding with respect to said first plane, the second fin being connected to the base by a second connecting segment arranged along a second edge of the base, the second edge being separate from the first edge.

The second fin may protrude with respect to said first plane on the side of a second face of the base, the second face being opposite said first face.

The support may comprise a third fin protruding with respect to said first plane on the side of a second face of the base, the second face being opposite said first face, the third fin being connected to the base by a third connecting segment arranged along the first portion of said first edge.

The base may have a substantially rectangular shape.

The base of the support may comprise at least one opening intended to cooperate with a fastening means.

The first fin may have a substantially rectangular shape or an "L" shape.

The support may be obtained by bending a metal sheet.

The light-emitting module may comprise an electronic board extending along said first face, the electronic board being electrically connected to the light source and to the electrical connector, the electronic board having a shape adapted to be deposited on the first face of the base by a movement along an axis perpendicular to said first plane without interference with the first fin.

The invention also relates to an optical module comprising a means for shaping a light beam and a light-emitting module as defined above.

The support of the light-emitting module may be fastened directly to said means for shaping a light beam, notably by way of a fastening screw passing through an opening provided in the base of the support.

The invention lastly relates to a luminous device for an automotive vehicle, comprising a housing intended to be fastened to an automotive vehicle and an optical module as defined above, the optical module being arranged inside the housing.

PRESENTATION OF THE FIGURES

DETAILED DESCRIPTION

Figure 1:
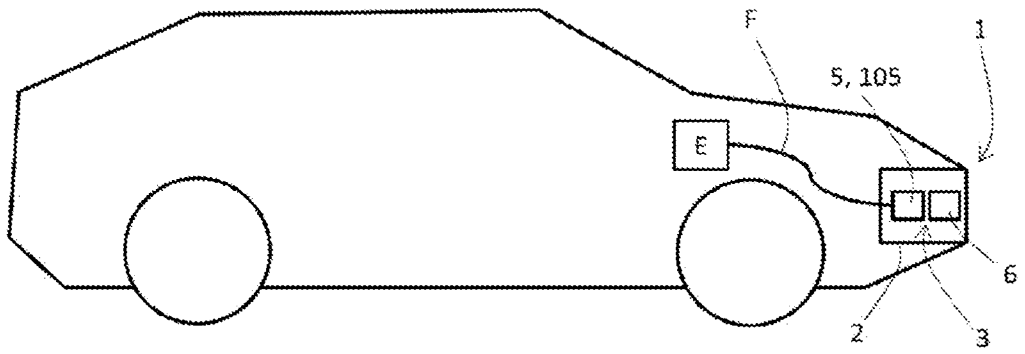
FIG. 1 is a schematic view of an automotive vehicle equipped with a luminous device according to one embodiment of the invention.

FIG. 1 is a schematic view of an automotive vehicle equipped with a luminous device 1 according to one embodiment of the invention. The luminous device 1 is an item of vehicle equipment able to produce rays of light so as to make the vehicle more visible and/or to light the environment of the vehicle. The luminous device 1 may be arranged, without preference, at the front, at the rear, or at any other location of the vehicle. The luminous device 1 may notably be a headlamp, a signaling light or even an interior lighting device for the vehicle. It comprises a housing 2, a closing outer lens for the housing and an optical module 3. The combination of the housing 2 and the outer lens envelops the optical module 3. The outer lens is transparent or translucent so as to transmit the rays of light to the outside of the luminous device. The housing 2 may notably comprise fastening means configured to fasten the luminous device to the vehicle.

The optical module 3 comprises a means for shaping a light beam 4 and a light-emitting module 5, 105. The means for shaping a light beam 4 may comprise one or more optical components such as lenses or reflectors. These optical components are arranged so as to orient the rays of light in a chosen direction. The light-emitting module is connected to an electrical energy source E by way of a wiring harness F.

Figure 2:
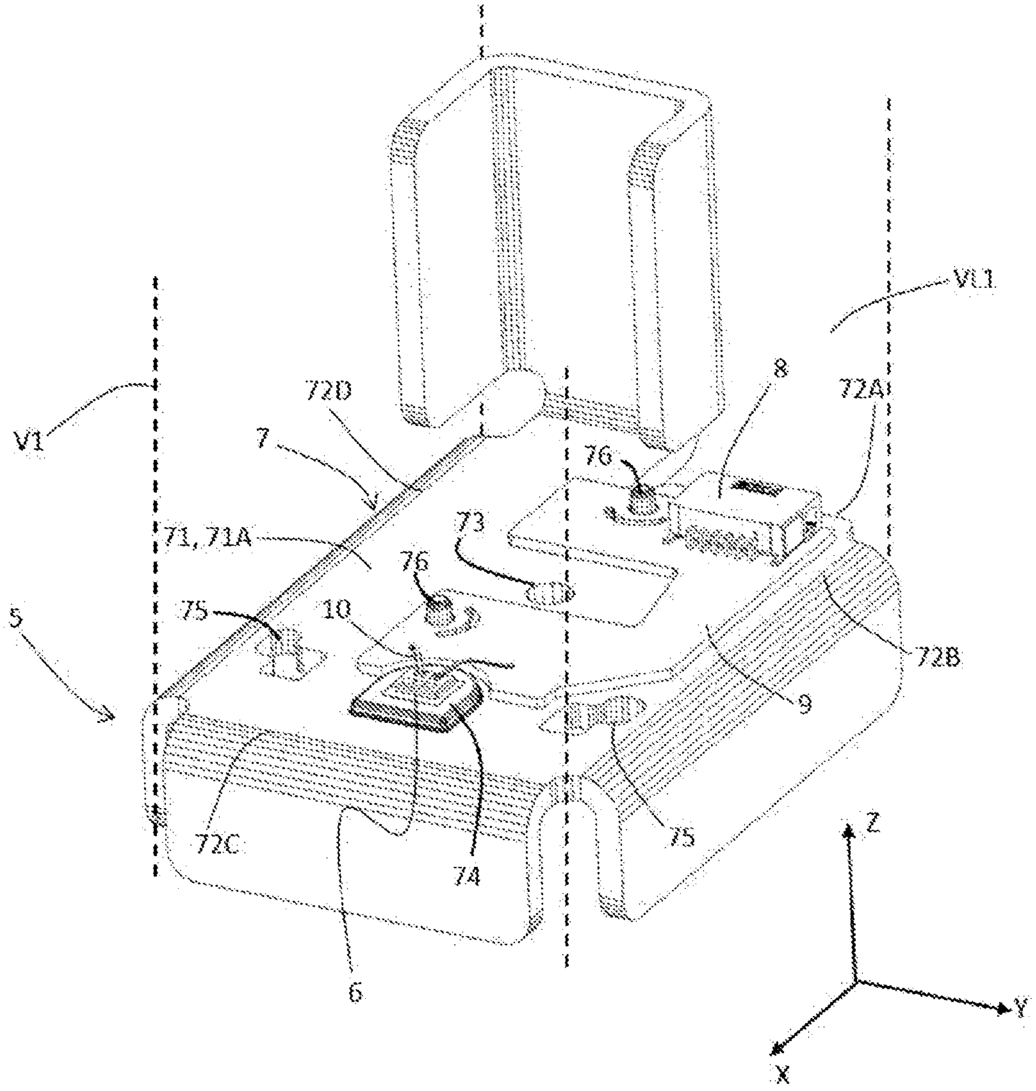
FIG. 2 is a first perspective view of a first embodiment of a light-emitting module of the luminous device.
Figure 3:
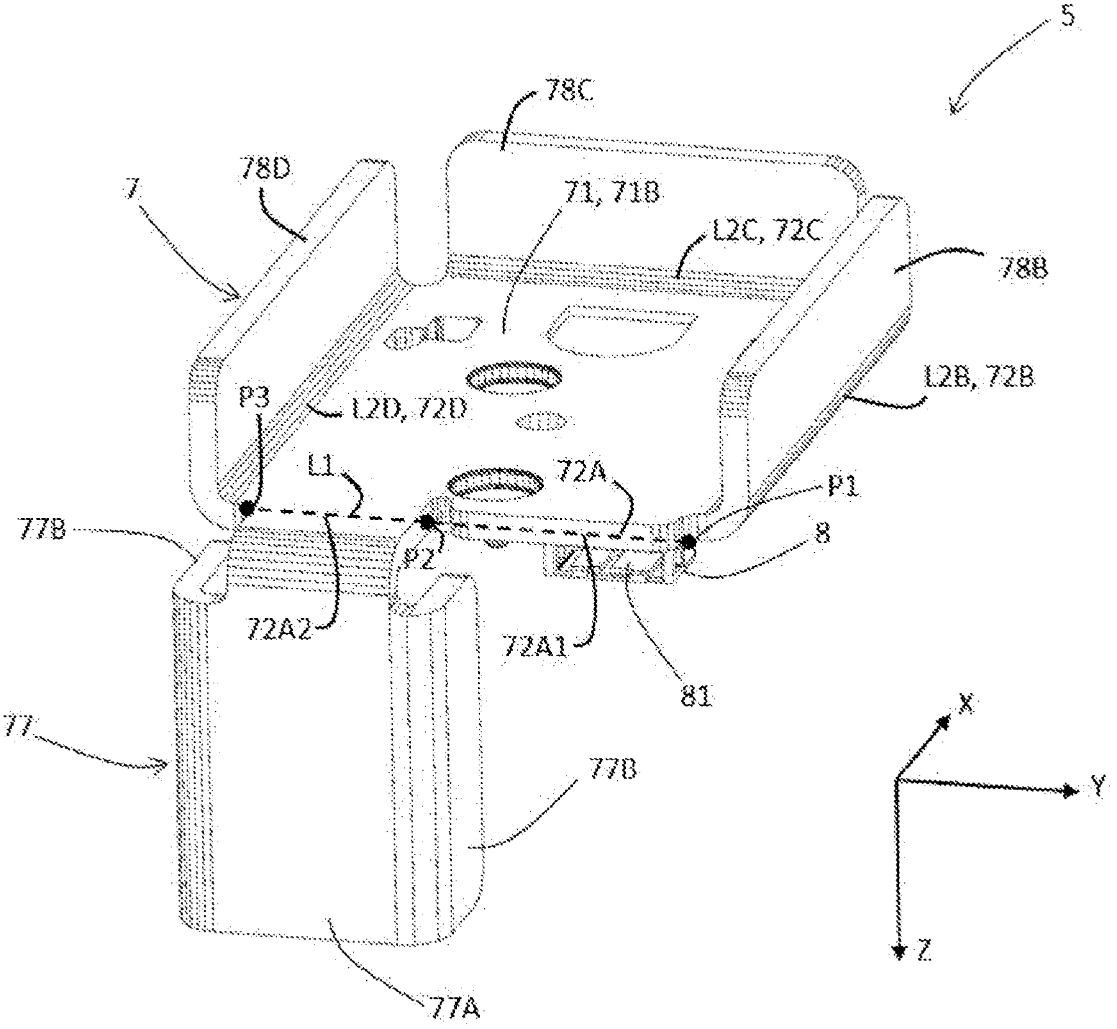
FIG. 3 is a second perspective view of the light-emitting module in FIG. 2.

FIGS. 2 and 3 illustrate a first embodiment of the light-emitting module 5. The light-emitting module 5 comprises a light source 6, a support 7, and an electrical connector 8 connected to the light source 6. The light-emitting module further comprises an electronic board 9 electrically connected to the light source 6 and to the electrical connector 8.

The light source 6 is preferably a light-emitting diode, but, in a variant, it could be any form of light source such as an incandescent bulb. The light source is able to emit rays of light and produces heat during its operation. The light-emitting module may comprise any number of light sources.

The support 7 is able to dissipate the heat emitted by the light source 6 by thermal convection. It therefore forms a heat-dissipating means but also a means for supporting or holding the light source 6 and the electrical connector 8. Advantageously, the support 7 is manufactured from a material with good thermal conductivity, notably metal. It has an exchange surface with ambient air that is large enough to dissipate the heat produced by the light source 6, such that the temperature of the light source 6 remains lower than a maximum operating temperature. The light source 6 is fastened, notably adhesively bonded, directly to the support 7 whereas the electrical connector is fastened to the support by way of the electronic board 9, which is fastened to the support. The light source 6 is electrically connected to the electrical connector 8 via the electronic board 9. To this end, electrical wires 10 are soldered both to the light source 6 and to the electronic board 9.

The support 7 comprises a substantially rectangular base 71 extending in a first plane. A reference frame XYZ is defined in the following manner: A first axis X is parallel to the two larger sides of the rectangle forming the base of the support. A second axis Y is parallel to the two smaller sides of the rectangle forming the base of the support. The first plane, referred to as plane XY, is therefore parallel to the axes X and Y. A third axis Z is perpendicular to the first plane XY. The axes X, Y and Z therefore form an orthogonal reference frame. In a variant, the base could have a different shape: it could for example be square, triangular or polygonal. At least one of the sides of the base could have a curved shape, such as a circular-arc shape.

The base 71 comprises two opposite faces: a first face 71A and a second face 71B. The light source 6, the electrical connector 8 and the electronic board 9 are arranged on the first face 71A of the base. Since the base is of rectangular shape, it comprises four separate rectilinear edges 72A, 72B, 72C and 72D. The edges 72B and 72D correspond to the large sides of the rectangle and the edges 72A and 72C correspond to the small sides of the rectangle.

The support 7 comprises an opening 73 intended to cooperate with a fastening means. Thus, the support may be fastened directly or indirectly to the housing 2 of the luminous device 1. Preferably, the support may be fastened directly to the means for shaping a light beam 4, thus allowing particularly precise positioning of the light source 6 with respect to the means for shaping a light beam 4. The opening 73 may be of circular shape, so as to cooperate with a fastening screw. The opening 73 may be arranged substantially in the center of the base 71.

The base 71 also comprises a pedestal 74 to which the light source 6 is fastened. This pedestal 74 forms a local elevation of the base 71. It may, for example, have a rectangular overall shape with one or more rounded sides. The pedestal may have, for example, dimensions along the axes X and Y of the order of double the dimensions of the light source respectively along these same axes. The pedestal 74 makes it possible to position the light source 6 so as to be elevated with respect to the electronic board 9. This makes it possible to prevent electrical components arranged on the electronic board 9 from intercepting the rays of light produced by the light source 6. It also facilitates the method for soldering the electrical wires 10 to the light source 6.

The support 7 also comprises first means 75 for positioning the support with respect to the housing 2. These first positioning means 75 make it possible to position the support precisely within the housing 2. These first positioning means 75 are formed by two openings arranged on either side of the pedestal 74. Lastly, the support 7 comprises second means 76 for positioning the electronic board 9. These second positioning means 76 are formed by two lugs extending from the first face 71A along the axis Z. They cooperate with holes of corresponding size provided in the electronic board 9.

The electronic board 9, or printed circuit board 9, extends parallel to the plane XY. It has the shape of a "U" overall. The electrical wires 10 are welded to a first branch of the "U" whereas the electrical connector 8 is arranged on a second branch of the "U". The opening 73 opens out between the two branches of the "U". The electronic board 9 may be in direct contact with the first face 71A, or be connected to the latter by way of a layer of a thermally conductive material, for example a thermal paste or a thermal adhesive.

The electrical connector 8 is a female connector of parallelepipedal overall shape. It may comprise a plastics body provided with snap-fastening means allowing a male connector to be held in position. The electrical connector 8 comprises an input 81 oriented parallel to the plane in which the base extends, and notably parallel to one of the edges of the base, in particular parallel to the axis X. In other words, the input extends substantially in a plane perpendicular to the axis X: the movement of a male connector for connection to the electrical connector 8 is therefore a movement parallel to the plane XY, and notably parallel to the axis X. The input 81 is positioned along a first portion 72A1 of the edge 72A of the base. With reference to FIG. 3, the first portion 72A1 may be defined as a half of the edge 72A, notably from a corner P1 of the base up to about the center P2 of the edge 72A.

It should be noted that the invention also applies to a light-emitting module in which the electrical connector 8 is a male connector. In this case, the input of the male connector denotes that part of the male connector which is intended to be introduced into a female connector. It is then a female connector which is moved, in a manner similar to what has been described above for the male connector, to effect the connection.

The support 7 also comprises a first fin 77 connected to the side 72A of the base 71, that is to say the same side of the base as that on which the opening 81 is arranged. The first fin forms a one-piece assembly with the base 71 and increases the total surface area of the support 7. The first fin 77 therefore improves the dissipation of heat realized by the support 7. The first fin 77 protrudes with respect to the plane XY on the side of the first face 71A, that is to say on the side of the electrical connector 8. In other words, the first fin 77 extends in a half-space delimited by the plane XY, this half-space notably comprising the electrical connector 8.

The first fin 77 is connected to the base 71 by a single connecting segment L1. The term "segment" refers to a portion of an uninterrupted line delimited by two ends. The two ends of the connecting segment L1 are identified by the points P2 and P3 in FIG. 3. According to the presented embodiment, the connecting segment is a straight segment, that is to say a rectilinear segment. In a variant, the connecting segment could also be a curved segment, notably if the base were not to have a rectangular shape. The connecting segment L1 is arranged along a second portion 72A2 of the first edge 72A. The second portion 72A2 is separate from the first portion 72A1. In particular, the second portion 72A2 is the portion of the edge 72A that is complementary to the first portion 72A1. The point P3 corresponds substantially to a corner of the base 71. The points P1 and P3 delimit the edge 72A.

The first fin 77 is not connected to the base by two or more connecting segments. The first fin 77 is not connected to the base by a discontinuous connecting line either. The first fin 77 is not a part added to the base 71 and fastened thereto but is integral with the base.

The light-emitting module 5 thus has a free volume VL1, or free space, positioned on the side of the first face 71A and plumb with the electrical connector 8. This free volume VL1 is delimited on a first side by the first portion 72A1 of the first edge 72A of the base 71 and on a second side by the first fin 77. The free volume VL1 is constituted of ambient air. Neither the first fin 77 nor even any other part of the support 7 extends in the free volume. The free volume VL1 has dimensions adapted to allow manual access to the electrical connector 8. Notably, the free volume VL1 has dimensions along the axes Y and Z at least equal to the dimensions of the electrical connector 8 respectively along these same axes. Consequently, this free volume extends at least facing the input of the electrical connector. Advantageously, the free volume VL1 is not delimited by any elements of the light-emitting module other than the first edge 72A and the first fin 77. It is therefore an open volume allowing broad access to the electrical connector 8. The free volume VL1 allows an operator's hand to easily reach the electrical connector 8.

The first fin 77 comprises a primary part 77A extending substantially in a second plane YZ. The second plane YZ is parallel to the axes Y and Z and therefore perpendicular to the first plane XY. The primary part 77A also has a rectangular shape with small sides parallel to the axis Y and large sides parallel to the axis Z. One of the small sides of the primary part of the fin corresponds substantially to the connecting segment L1.

The first fin 77 also comprises at least one secondary part 77B extending in a third plane XZ perpendicular to the first plane XY and to the second plane YZ. According to the presented embodiment, the first fin 77 comprises two secondary parts 77B arranged along the two large sides of the primary part 77A. The two secondary parts 77B may also have a substantially rectangular shape. They may have substantially the same size or one of the two secondary parts may be larger than the other. In a variant, the first fin 77 could comprise a different number of secondary parts, notably one or three secondary parts connected to the primary part 77A by the two large sides thereof and/or by the small side thereof opposite the connecting segment L1.

Preferably, the secondary part or parts 77B extend in a volume V1 defined by an orthogonal projection of the base 71, that is to say a projection of the base along an axis perpendicular to the plane in which it extends, i.e. a projection along the axis Z. This volume V1 is notably delimited by dashed lines in FIG. 2. In other words, the secondary part or parts 77B overhang the base 71. Thus, the addition of secondary parts to the primary part of the fin increases the exchange surface of the support 7 with the air while still limiting the general footprint of the light-emitting module 5.

The support 7 also comprises a set of second fins 78B, 78C, 78D protruding with respect to the first plane XY. The second fins 78B, 78C, 78D are connected to the base 71 by a set of second connecting segments L2B, L2C, L2D arranged respectively along the edges 72B, 72C and 72D of the base 71. In particular, the second fins 78B, 78C, 78D extend perpendicularly to the base, on the side of the second face 71B of the base. The second fins therefore extend in an opposite direction to the first fin 77. Each of the second fins 78B, 78C, 78D has a rectangular overall shape and extends over the entire length of that edge 72B, 72C, 72D of the base to which it is connected.

Finally, the four sides of the base comprise a fin extending perpendicularly thereto. The heat exchange surface with the ambient air is thus increased. The dimensions and the orientation of each fin may be adapted depending on the available space for the support 7. Each of the fins may comprise a primary part defining a first plane perpendicular to the base and a secondary part defining a second plane perpendicular to the base and perpendicular to the first part. In a variant, it would be possible for these different planes to not be perpendicular. The angle formed between these different planes could, for example, be between 45° and 135°.

Between each fin and the base, and between each part of a same fin, rounded portions may be provided. These rounded portions make it possible to obtain non-dangerous surfaces. In particular, the rounded portion formed between the primary part and the secondary part of the first fin offers a smooth surface without any edges in the vicinity of the input 81 of the electrical connector 8. The operator responsible for connecting the male connector in the electrical connector 8 does not risk injuring themselves on a sharp edge of the first fin. The same effect is obtained if the electrical connector 8 were to be a male connector cooperating with a female connector. In addition, these rounded portions allow the support to be manufactured by bending of a metal sheet as will be described in detail below.

By way of indication, the primary part 77A of the first fin may have a surface area of between 10% and 50% of the surface area of the base, notably about 25%. The total surface area of the fins 77, 78B, 78C, 78D may be between 50% and 150% of the surface area of the base. The small sides of the base 71 may have, for example, a dimension of between 20 mm and 80 mm. The large sides of the base 71 may have, for example, a dimension of between 40 mm and 100 mm. The thickness of the base and of the different fins may be uniform and/or for example between 1 mm and 4 mm.

Advantageously, the light-emitting module is fastened in the housing 2 of the luminous device 1 such that the plane XY in which the base 71 extends is a horizontal plane. The wiring harness F therefore extends substantially horizontally from the male connector connected in the electrical connector 8. All the fins extend parallel to the axis Z which is therefore a vertical axis. The dissipation of heat by vertical surfaces is more effective than the dissipation of heat by horizontal surfaces. Thus, the fins significantly improve the effectiveness of the heat exchange.

Figure 4:
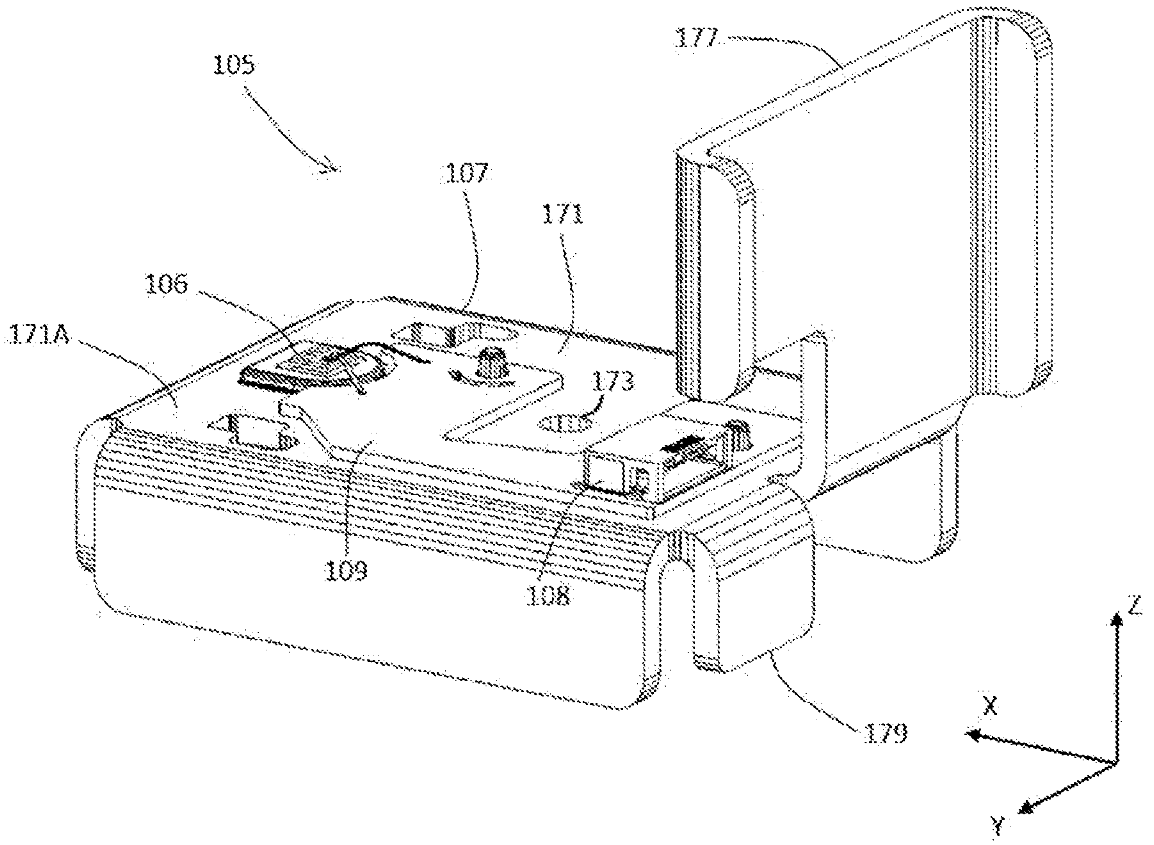
FIG. 4 is a first perspective view of a second embodiment of a light-emitting module of the luminous device.
Figure 5:
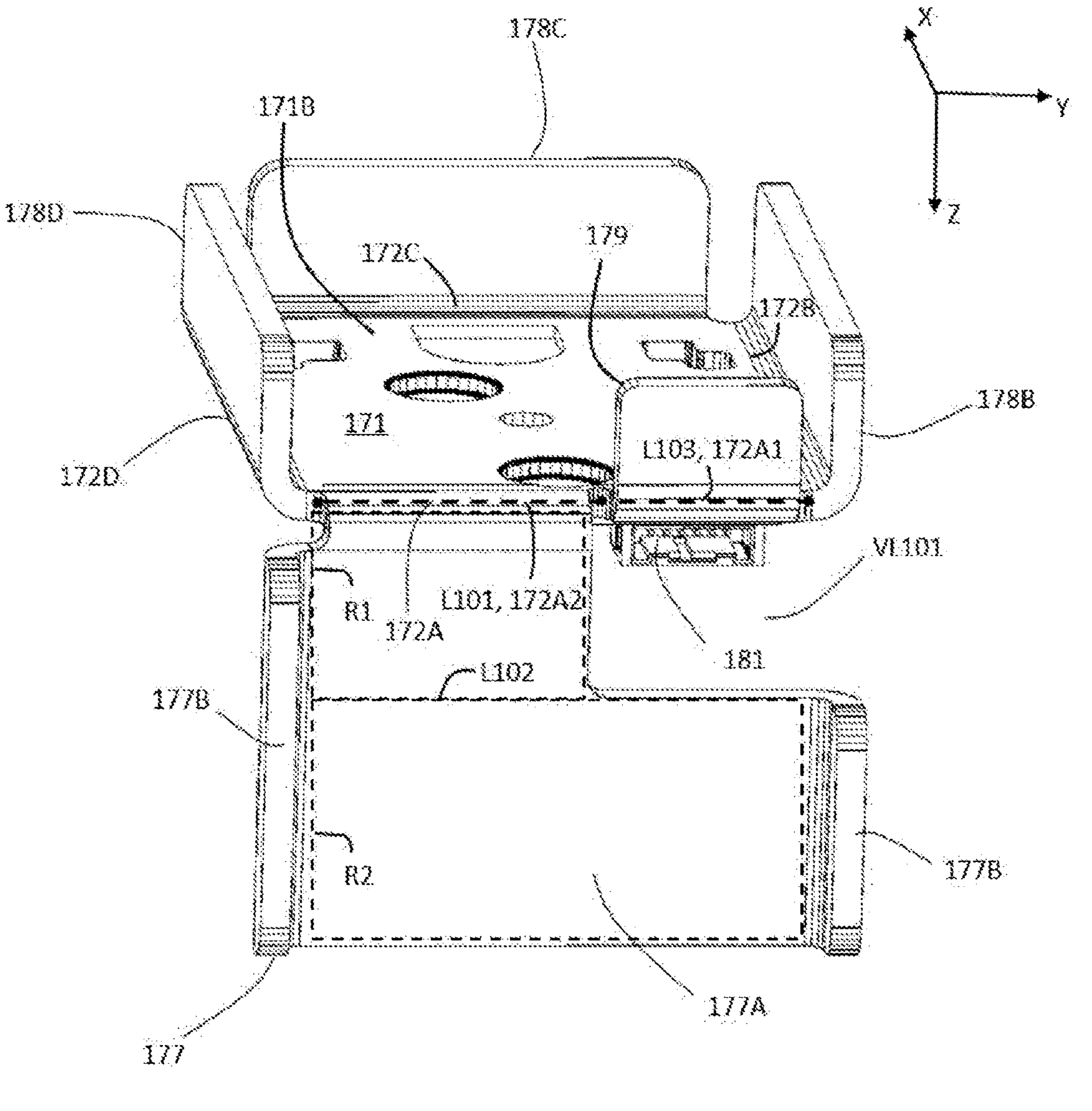
FIG. 5 is a second perspective view of the light-emitting module in FIG. 4.

A description will now be given of a second embodiment of the light-emitting module 105 with reference to FIGS. 4 and 5. The light-emitting module 105 comprises a light source 106, an electrical connector 108 and an electronic board 109 that are identical respectively to the light source 6, to the electrical connector 8 and to the electronic board 9 of the first embodiment. The light-emitting module 105 also comprises a support 107 provided with a base 171 and with a set of second fins 178B, 178C, 178D that are identical respectively to the base 71 and to the second fins 78B, 78C, 78D. Likewise, the base 171 has a rectangular shape, the four edges of which are identified by the references 172A, 172B, 172C and 172D. The light source 106, the electrical connector 108 and the electronic board 109 are arranged on a first face 171A of the base. The electrical connector 108 comprises an input 181 positioned along a first portion 172A1 of the edge 172A of the base. The second embodiment differs from the first embodiment in that the support 107 comprises a first fin 177 of a different shape to the first fin 77 and in that it comprises a third fin 179. To streamline the description, the features that are common between the two light-emitting modules 5, 105 and their embodiment variants are not described again below.

The first fin 177 is connected to the base 171 by a single connecting segment L101. The connecting segment L101 is arranged along a second portion 172A2 of the first edge 172A, separate from the first portion 172A1. The first fin 177 comprises a planar primary part 177A substantially in the shape of an "L". The primary part 177A has the shape of two juxtaposed rectangles R1, R2 that are identified by dashed lines in FIG. 5. A first rectangle R1 has a side corresponding to the single connecting segment L101. A second rectangle R2 is materially connected to the first rectangle R1 by a connecting segment L102, the connecting segments L101 and L102 forming two opposite sides of the first rectangle R1. The connecting segment L102 forms only a part of one of the sides of the second rectangle R2. That side of the second rectangle R2 which comprises the connecting segment L102 extends plumb with the electrical connector 108. The second rectangle R2 therefore has a greater dimension along the axis Y than the first rectangle R1. The dimension of the second rectangle R2 along the axis Y is substantially equal to the dimension of the base 171 along the axis Y.

A free volume VL101 is thus still present around the electrical connector 108 and allows an operator to easily connect the wiring harness F. The "L" shape of the primary part 177A of the first fin 177 further increases the heat exchange surface with the ambient air in order to more effectively cool the light source.

The first fin 177 further comprises two secondary parts 177B extending perpendicularly to the primary part 177A, on either side of the primary part 177A. According to the presented embodiment, the secondary parts 177B do not extend toward the base 171, but, on the contrary, in a direction away from the base 171. Thus, the fin 177 is not inscribed within a volume defined by an orthogonal projection of the base 171. In a variant, the secondary parts could face toward the base 171 as in the first embodiment, and this would allow the compactness of the light-emitting module to be increased. Likewise, according to a variant of the first embodiment, the secondary parts 77B could extend in a direction away from the base 71.

The third fin 179 protrudes with respect to the base 171 on the side of a second face 171B of the base, the second face 171B being opposite the first face 171A. In other words, the third fin extends on the same side as the second fins 178B, 178C, 178D, that is to say on the side opposite that face of the base on which the light source 106, the electrical connector 108 and the electronic board 109 are arranged. The third fin extends substantially perpendicularly to the base 171, parallel to the plane YZ. The third fin is connected to the base 171 by a connecting segment L103 arranged along the first portion 172A1 of said first edge 172A. Advantageously, the dimensions of the third fin correspond substantially to the free volume VL101 formed in the hollow of the "L" of the primary part 177A of the first fin 177. The third fin has a rectangular overall shape. The two sides of the third fin 179 that are parallel to the axis Z have substantially the same dimension as the sides of the rectangle R1 that are parallel to the axis Z. The two sides of the third fin 179 that are parallel to the axis Y have substantially the same dimension as the difference between the dimension of the second rectangle R2 along the axis Y and the dimension of the first rectangle R1 along the axis Y.

To manufacture either one of the light-emitting modules 5 and 105, it is possible to first manufacture the support by cutting and bending a metal sheet. Specifically, the supports 7, 107 have shapes that are compatible with such a manufacturing method, notably pressing. In other words, the support 5, 105 is a pressed part. The support can therefore advantageously be a one-piece part, that is to say made of a single piece. Such a method is simple to implement and makes it possible to achieve lower production costs. In addition, the proposed shapes of the support avoid the generation of large offcuts in the cut metal sheet. In particular, the third fin 179 is formed with the material corresponding to the hollow of the "L" of the primary part 177A. The third fin 179 can therefore be formed without increasing the dimensions of the template in the metal sheet from which the support 107 originates.

The light source 6, 106 can then be adhesively bonded to the pedestal of the support. The electronic board 9, 109 can be deposited on the base simply by a movement of the electronic board along an axis perpendicular to the plane in which the base extends, without interference with the first fin. The secondary parts 77B, 177B of the first fin and the electronic board therefore have dimensions compatible with such an assembly method. The assembly method can therefore remain sufficiently simple to implement since a mechanical arm that is mobile solely along the axis Z is sufficient to deposit the electronic board. The electronic board can then be fastened to the support and the electrical wires 10 can be soldered to the light source and to the electronic board.

The light-emitting module 5, 105 thus obtained can then be fastened to a means for shaping a light beam 4, notably using a screw that cooperates with the hole 73 provided for this purpose. An optical module 3 which can be fastened to the housing 2 of the luminous device 1 is thus obtained. The wiring harness F can also be connected to the electrical connector 8. This connection operation is easy because the fins, even though they have a large exchange surface with the ambient air, leave a free volume VL1, VL101 around the electrical connector that is sufficient for the passage of a hand. In addition, the rounded portions formed at the interface between the fins and the base or between the different parts of the first fin offer non-dangerous surfaces, thus preventing the fingers of an operator manipulating the wiring harness from being injured or scraped. Subsequently, during any maintenance operation, the wiring harness F can also be easily disconnected from the electrical connector.

Due to the presence of the fins, the heat exchange with the ambient air and therefore the maintenance of an optimal operating temperature of the light-emitting module is improved considerably. The support remains compact and easy to incorporate into the housing of a luminous device.

The invention claimed is:

1. A light-emitting module comprising:

a light source including a light-emitting diode;

a support configured to dissipate heat; and an electrical connector connected to the light source, the support comprising a base extending substantially in a first plane, the base being provided with a first face to which the light source and the electrical connector are fastened, the electrical connector comprising an input arranged along a first portion of a first edge of said base, the support comprising a first fin protruding with respect to said first plane on a side of said first face, the first fin being connected to the base by a single connecting segment, the connecting segment being arranged along a second portion of said first edge, and the second portion being spaced apart from the first portion by an air gap.

2. The light-emitting module according to claim 1, wherein the first fin comprises a primary part extending substantially in a second plane perpendicular to said first plane.

3. The light-emitting module according to claim 2, wherein the fin comprises at least one secondary part extending substantially in a third plane perpendicular to said first plane and to said second plane.

4. The light-emitting module according to claim 3, wherein at least one secondary part extends in a volume defined by an orthogonal projection of the base.

5. The light-emitting module according to claim 2, wherein the support comprises a second fin protruding with respect to said first plane, the second fin being connected to the base by a second connecting segment arranged along a second edge of the base, the second edge being separate from the first edge.

6. The light-emitting module according to claim 2, wherein the support comprises a third fin protruding with respect to said first plane on the side of a second face of the base, the second face being opposite said first face, the third fin being connected to the base by a third connecting segment arranged along the first portion of said first edge.

7. The light-emitting module according to claim 2, wherein the base has a substantially rectangular shape, and/or in that the first fin has a substantially rectangular shape or an "L" shape.

8. The light-emitting module according to claim 2, wherein the support is obtained by bending a metal sheet.

9. The light-emitting module according to claim 2, further comprising:

an electronic board extending along said first face, the electronic board being electrically connected to the light source and to the electrical connector, the electronic board having a shape adapted to be deposited on the first face of the base by a movement along an axis perpendicular to said first plane without interference with the first fin.

10. An optical module comprising a means for shaping a light beam and the light-emitting module according to claim 2.

11. An optical module, further comprising:

a means for shaping a light beam and the light-emitting module according to claim 1.

12. The optical module according to claim 11, wherein the support of the light-emitting module is fastened directly to said means for shaping a light beam by way of a fastening screw passing through an opening provided in the base of the support.

13. A luminous device for an automotive vehicle comprising a housing configured to be fastened to the automotive vehicle and the optical module according to claim 11, the optical module being arranged inside the housing.

14. A luminous device for an automotive vehicle comprising a housing configured to be fastened to the automotive vehicle and the optical module according to claim 12, the optical module being arranged inside the housing.

15. The light-emitting module according to claim 1, wherein the support comprises a second fin protruding with respect to said first plane, the second fin being connected to the base by a second connecting segment arranged along a second edge of the base, the second edge being separate from the first edge.

16. The light-emitting module according to claim 15, wherein the second fin protrudes with respect to said first plane on the side of a second face of the base, the second face being opposite said first face.

17. The light-emitting module according to claim 15, wherein the support comprises a third fin protruding with respect to said first plane on the side of a second face of the base, the second face being opposite said first face, the third fin being connected to the base by a third connecting segment arranged along the first portion of said first edge.

18. The light-emitting module according to claim 1, wherein the base has a substantially rectangular shape, and/or in that the first fin has a substantially rectangular shape or an "L" shape.

19. The light-emitting module according to claim 1, wherein the support is obtained by bending a metal sheet.

20. The light-emitting module according to claim 1, further comprising:

an electronic board extending along said first face, the electronic board being electrically connected to the light source and to the electrical connector, the electronic board having a shape adapted to be deposited on the first face of the base by a movement along an axis perpendicular to said first plane without interference with the first fin.

* * * * *